United States Patent
Mitterbacher et al.

(10) Patent No.: US 10,172,195 B2
(45) Date of Patent: Jan. 1, 2019

(54) LED DRIVER

(71) Applicant: TRIDONIC GMBH & CO KG, Dornbirn (AT)

(72) Inventors: Andre Mitterbacher, Dornbirn (AT); Paul Dalby, Cleveland (GB); Deepak Makwana, Tyne and Wear (GB); Wayne Bell, Durham (GB)

(73) Assignee: TRIDONIC GMBH & CO KG, Dornbirn (AT)

( * ) Notice: Subject to any disclaimer, the term of this patent is extended or adjusted under 35 U.S.C. 154(b) by 416 days.

(21) Appl. No.: 15/122,498

(22) PCT Filed: Feb. 5, 2015

(86) PCT No.: PCT/EP2015/052381
§ 371 (c)(1),
(2) Date: Aug. 30, 2016

(87) PCT Pub. No.: WO2015/132032
PCT Pub. Date: Sep. 11, 2015

(65) Prior Publication Data
US 2017/0079098 A1    Mar. 16, 2017

(30) Foreign Application Priority Data
Mar. 6, 2014    (DE) .................. 10 2014 204 127

(51) Int. Cl.
H05B 33/08    (2006.01)
H02M 3/335    (2006.01)

(52) U.S. Cl.
CPC .... H05B 33/0815 (2013.01); H02M 3/33507 (2013.01); H02M 3/33523 (2013.01); H05B 33/0842 (2013.01)

(58) Field of Classification Search
CPC ............ H05B 33/0815; H05B 33/0842; H05B 33/0884; H05B 33/083; H05B 37/02; H05B 37/0227; H02M 3/33523; H02M 3/33507
(Continued)

(56) References Cited

U.S. PATENT DOCUMENTS 9,369,049 B2 *    6/2016    Xu ..................... H02M 3/33523
2006/0034102 A1    2/2006    Yang et al.
(Continued)

FOREIGN PATENT DOCUMENTS

WO    2012/167127    12/2012

OTHER PUBLICATIONS

International Search Report for parent patent application, PCT/EP2015/052381, dated Oct. 26, 2015.
(Continued)

Primary Examiner — Haissa Philogene
(74) Attorney, Agent, or Firm — Andrus Intellectual Property Law

(57) ABSTRACT

The invention relates to an operating device (1) for operating lighting means, in particular LEDs, comprising: a potential-isolated clocked converter (3), having a transformer (T), which has a primary winding (N1) and a seconding winding (N2), and having a controllable switch (M1) arranged on the primary side, wherein the converter (3) can be supplied with a supply voltage converter (3); means (4) for directly or indirectly sensing the output voltage (Vout); and a control unit (ST) for controlling the switch (M1), wherein the secondary current (I2) through the secondary winding (N2) linearly drops, starting from a position value (I2max), which the switch (M1) is switched off, wherein the control unit (ST) is designed to adaptively sense a discharge duration (Tdischarge) between a switch-off of the switch (M1) and a
(Continued)

subsequent drop in the secondary current (12) to zero in order to control the secondary current (I2).

12 Claims, 2 Drawing Sheets

(58) Field of Classification Search
USPC .... 315/247, 246, 224, 225, 274–282, 185 S, 315/209 R, 291, 307–326
See application file for complete search history.

(56) References Cited

U.S. PATENT DOCUMENTS

| | | |
|---|---|---|
| 2012/0025722 A1 | 2/2012 | Mokry et al. |
| 2012/0025736 A1 | 2/2012 | Singh et al. |
| 2012/0169245 A1 | 7/2012 | Chen |
| 2013/0257305 A1 | 10/2013 | Lee et al. |
| 2014/0035476 A1 | 2/2014 | Hwang et al. |
| 2016/0302266 A1* | 10/2016 | Marent ................ H05B 33/083 |

OTHER PUBLICATIONS

Austrian Search Report for co-pending application in Austria dated Mar. 3, 2015.

\* cited by examiner

LED DRIVER

CROSS REFERENCE TO RELATED APPLICATION

The present application is the U.S. national stage application of International Application PCT/EP2015/052381, filed Feb. 5, 2015, which international application was published on Sep. 11, 2015 as International Publication WO 2015/132032 A1. The International Application claims priority of German Patent Application 10 2014 204 127.9 filed Mar. 6, 2014.

FIELD OF THE INVENTION

The invention relates to an operating device for controlling lighting means, for example, LED lines as well as a control unit for controlling such an operating device. In addition, the invention relates to a method for controlling lighting means, for example, LED lines.

BACKGROUND

It is known to use a flyback converter for operating an LED module. The flyback converter is part of an appropriate operating device and is operated, for example, in critical conduction mode, also called borderline mode. At the same time, the switch of the flyback converter is turned on on the primary side, so that in this activation phase the current on the primary side is constantly increasing. This results in a constant negative voltage on a detection coil at the flyback converter.

When the current has reached a predetermined peak value, the switch is turned off. After switch-off, the voltage on the detection coil jumps to a positive value, oscillates for a certain time period and then settles at a voltage corresponding to the output voltage Vout.

During this deactivation phase, the current on the secondary side decreases linearly. When the current on the secondary side reaches zero, the steady and preferably linear voltage on the detection coil drops. Thus, the voltage on the detection coil drops significantly when the current on the secondary side reaches zero. In the critical conduction mode, it is now necessary to be able to detect the zero point of the current on the secondary side to turn the switch of the flyback converter on again.

From prior art, it is known to monitor the voltage on the detection coil and compare it with a low predetermined restarting threshold. If the voltage on the detection coil falls below this threshold, it is detected that the current on the secondary side has dropped to zero and the switch on the primary side is turned on again.

In the technology according to prior art, the problem is that the actual time period until the zero crossing of the current on the secondary side cannot exactly be detected when such a fixed comparator threshold is selected.

SUMMARY OF THE INVENTION

The invention begins with the concept that an adaptive threshold value has been selected as the detection threshold. In particular, this threshold detects the significant drop of the detection voltage more precisely by scanning the steady voltage that is available after the switch has been turned off, and depending on, i.e., as a function of, the scanned voltage, the switch-off threshold is selected. The steady voltage, which corresponds to the output voltage of the flyback converter, depends on the concrete design of the LED module, in particular on the number of LEDs in the LED module.

According to one aspect of the invention, an operating device for operating lighting means, especially LEDs is provided. The operating device comprises a potential-isolated clocked converter, having a transformer, which has a primary winding and a secondary winding, and having a controllable switch arranged on the primary side. The converter is supplied with a supply voltage on the primary side. The lighting means is supplied on the secondary side of the converter by means of an output voltage. The operating device comprises means for directly or indirectly detecting the output voltage. The operating device comprises a control unit for controlling the switch. While the switch is turned off, the secondary current through the secondary winding drops linearly, starting from a positive value. The control unit is configured to detect adaptively a discharge duration between turning off the switch and a subsequent drop of the secondary current to zero.

This means that according to the invention, the output voltage is not compared with a fixed threshold value to determine discharge duration. Rather, the discharge duration is detected adaptively, especially by comparing an electric quantity of the operating device with an adaptive reference value.

The discharge duration is determined by taking into account the detection of the steady output voltage which results from turning off the switch.

The discharge duration is determined by making a comparison between the detected output voltage and an adaptive threshold value.

The adaptive threshold value depends on a value of the steady output voltage which is available after turning off the switch.

The control unit is configured to select the threshold value as a specific percentage below the value of the steady output voltage available after the switch has been turned off.

This means that the end of the discharge duration corresponds to the point of time in which the detected output voltage reaches a value which is a specific percentage below the value of the steady output voltage.

According to the invention, the detection of the discharge duration can also be adaptive in the sense that the output voltage is not only compared with the fixed threshold value but the discharge voltage initially determined by means of a comparison with the fixed threshold value is adaptively detected in that an adaptive correction time period is taken into consideration.

To detect the discharge duration, first the point of time of falling below a fixed threshold can be determined by means of the detected output voltage. Then this point of time can be corrected by means of an adaptive time period.

The adaptive time period can depend on a detected value of the steady output voltage available after the switch has been turned off.

According to a further aspect of the invention, a control unit has been provided for controlling an operating device for lighting means, in particular LEDs. The operating device comprises a potential-isolated clocked converter having a transformer for a galvanic isolation between a primary side and a secondary side. The control unit comprises an output for transmitting a control signal to control a switch arranged in the converter on the primary side, wherein, while the switch is turned off, the secondary current on the secondary side of the transformer drops linearly, starting from a positive value. The control unit comprises an input for directly or indirectly detecting the output voltage of the converter. The control unit is configured to detect adaptively a discharge duration between a switch-off of the switch and a subsequent drop in the secondary current to zero in order to control the secondary current.

According to a further aspect of the invention, a method is provided for operating lighting means, in particular LEDs. The method is performed by means of a potential-isolated clocked converter having a transformer, which has a primary winding and a secondary winding and a controllable switch arranged on the primary side, wherein, while the switch is turned off, the secondary current through the secondary winding drops linearly, starting from a positive value. On the primary side, the converter is supplied with a supply voltage. On the secondary side, the lighting means are supplied by means of an output voltage of the converter. A discharge duration is adaptively determined between a switch-off of the switch and a subsequent drop in the secondary current to zero in order to control the secondary current.

According to a further aspect of the invention, an operating device is provided for operating lighting means, in particular LEDs. The operating device comprises a potential-isolated clocked converter having a transformer which comprises a primary winding and a secondary winding and a controllable switch arranged on the primary side. On the primary side, the converter can be supplied with a supply voltage. On the secondary side, the lighting means can be supplied by means of an output voltage of the converter. The operating device comprises means for directly or indirectly detecting the output voltage. The operating device comprises an analog-to-digital converter for converting the analogously acquired output voltage into digital values. The operating device comprises a control unit for controlling the switch, wherein, while the switch is turned off, the secondary current through the secondary winding drops linearly, starting from a positive value. The control unit is configured to detect adaptively a discharge duration between a switch-off of the switch and a subsequent drop in the secondary current to zero, depending on the digital values, in order to control the secondary current.

According to a further aspect of the invention, a control unit is provided for controlling an operating device for lighting means, in particular LEDs. The operating device comprises a potential-isolated clocked converter having a transformer for a galvanic isolation between a primary side and a secondary side. The control unit comprises an output for transmitting a control signal to control a switch arranged in the converter on the primary side, wherein, while the switch is turned off, the secondary current on the secondary side of the transformer drops linearly, starting from a positive value. The control unit comprises an input for directly or indirectly detecting the output voltage of the converter in analog form. The control unit includes an analog-to-digital converter for converting the analog acquired output voltage into digital values. The control unit is configured to detect adaptively a discharge duration between a switch-off of the switch and a subsequent drop in the secondary current to zero, depending on the digital values, in order to control the secondary current.

According to a further aspect of the invention, a method is provided for operating lighting means, in particular LEDs. The method is performed by means of a potential-isolated clocked converter having a transformer, which has a primary winding and a secondary winding and a controllable switch arranged on the primary side, wherein, while the switch is turned off, the secondary current through the secondary winding drops linearly, starting from a positive value. On the primary side, the converter is supplied with a supply voltage. On the secondary side, the lighting means are supplied by means of an output voltage of the converter. The output voltage is directly or indirectly detected and converted into digital values. A discharge duration is determined between a switch-off of the switch and a subsequent drop in the secondary current to zero, depending on the digital values, in order to control the secondary current.

Preferably, the converter, for example, in the form of a flyback converter, shall be operated in such a way that the LEDs or the LED module is operated with a constant current. Preferably, feedback signals are supplied merely on the primary side and thus are not supplied with a control circuit on the primary side for bridging the galvanic isolation.

Preferably, the secondary current is determined indirectly, namely by incorporating a maximum value or peak value of the primary current, the transmission ratio of the transformer, as well as the knowledge of the switch-on duration of the primary switch and the switch-off duration or discharge duration between a maximum value and a zero value of the current. Therefore, it is important to have detailed knowledge about the switch-off duration or discharge duration.

BRIEF DESCRIPTION OF THE DRAWINGS

Subsequently, the description also involves the enclosed drawings. It is shown.

DETAILED DESCRIPTION

Figure 1:
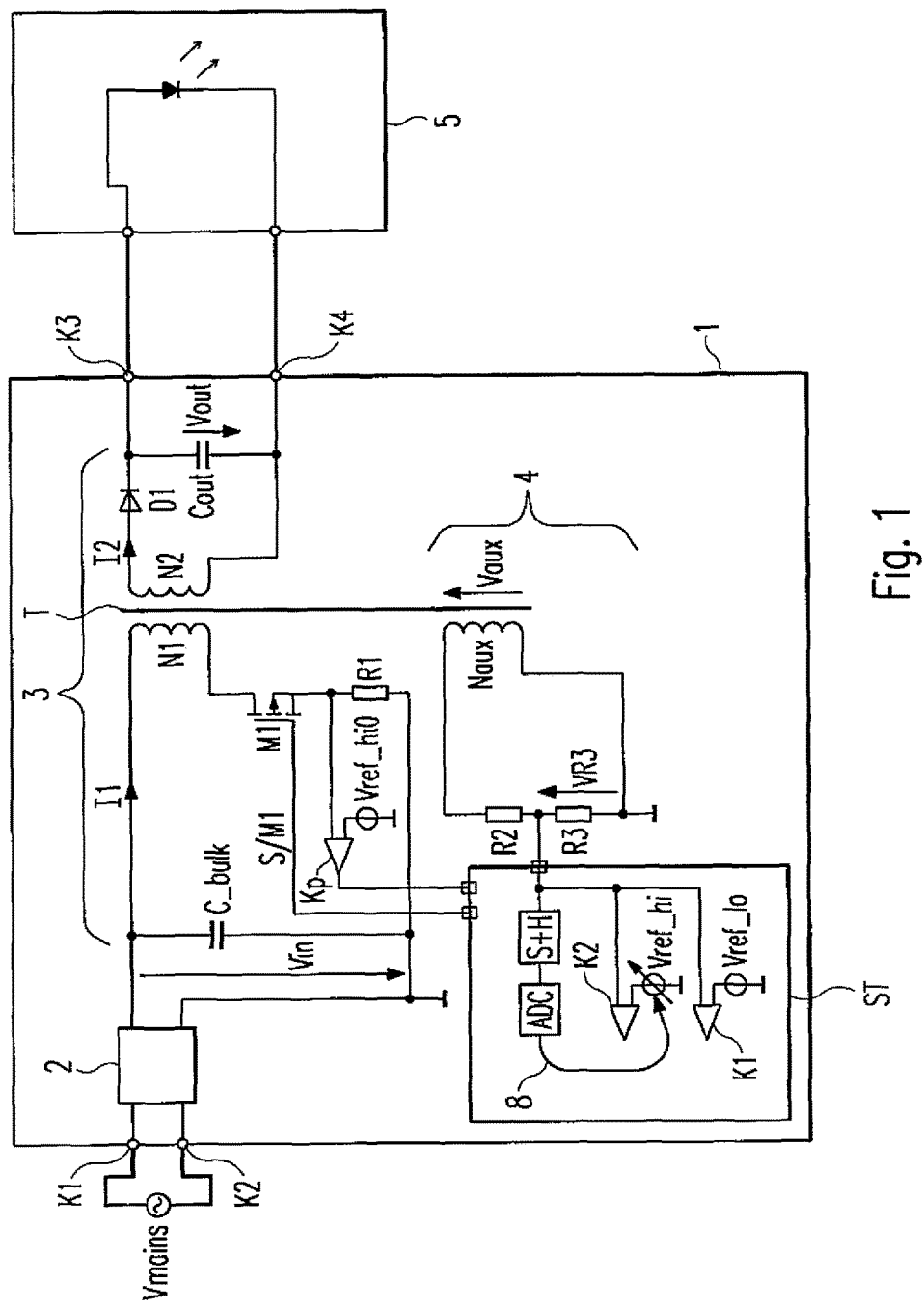
FIG. 1 is the circuit diagram of an embodiment of the invention-based operating device for lighting means.

FIG. 1 shows the circuit diagram of a first embodiment of an operating device for lighting means configured in accordance with the invention.

The invention-based operating device 1 shown in a simplified manner in the embodiment of FIG. 1 is provided for operating lighting means, in particular for operating an LED module 5. On the input side, the operating device 1 is connected by means of input terminals K1, K2 to a power supply network, which provides a mains supply voltage Vmains. Here, the mains supply voltage Vmains provides for example an alternating voltage to the operating device.

Preferably, the operating device 1 comprises an input stage 2, a converter 3, an acquisition unit 4 and a control unit ST. The input stage 2 is optional and can be used to filter the mains supply voltage Vmains. For this purpose, the input stage can have 2 filter components or circuits (not shown). In addition, or alternatively, the input stage 2 can perform a rectification of the optionally filtered mains supply voltage Vmains, for example, by means of a full-bridge rectifier having four diodes for converting the alternating voltage into a pulsating DC voltage. The output of the optionally available input stage 2 is the voltage Vin and is supplied to the converter 3. Preferably, this voltage Vin is a rectified alternating voltage, in particular a one-way rectified alternating voltage.

In the embodiment shown, the converter 3 is a so-called flyback converter, which can also be depicted as a flyback transformer or buck/boost converter, and which can also have alternative topologies, especially topologies having a galvanic isolation. In the embodiment shown in FIG. 1, the flyback converter is used as an example for a potential-isolated converter which is clocked by at least one switch M1 and which has one transformer for the potential isolation. However, the operating device 1 can also have different clocked circuits, especially with galvanic isolation, such as a forward converter or a push-pull converter, for example, a push-pull converter with half-bridge or full-bridge control.

The flyback converter 3 comprises a transformer T, for example, in the form of a transformer having a primary winding N1 and a secondary winding N2. The transformer T is used for potential isolation between a primary side and a secondary side. The transformer T serves the purpose of transmitting electrical energy from the primary winding N1 to the secondary winding N2 or from the primary side to the secondary side. Preferably, the energy is absorbed in two different phases, both on the primary side, and transmitted again on the secondary side. Preferably, therefore, the transformer has an air gap for an intermediate storage of energy between the two phases.

The flyback converter 3 comprises a controllable switch M1. In well-known manner, by respectively alternatingly opening and closing the switch M1, energy provided by the voltage applied at the input side of the flyback converter is transmitted to the secondary side of the flyback converter 3. This energy transmitted to the secondary side can be used to operate LED module 5, which can be connected on the secondary side. At the same time, the energy transmission takes place when the switch M1 is open, wherein for this purpose a diode D1 is provided on the output side of the flyback converter 3.

The switch M1 is connected in series with the primary winding N1, so that a current on the primary side can flow through this primary winding N1 when the controllable switch M1 is closed. However, when the switch M1 is open, no current can flow through the primary winding N1. For example, the switch M1 is configured in the form of a controllable transistor, especially in the form of an FET or MOSFET transistor. The switch M1 is controlled by the control unit ST of the operating device. Preferably, this control unit ST is located on the primary side of the flyback converter or transformer T.

In the embodiment shown, the switch M1 is a MOSFET transistor, wherein the gate input of the switch M1 is configured as a control input and connected with the control unit ST. The switch M1 is turned on and off via the control input by means of a control signal S/M1, which is generated by the control unit ST. In particular, the switch M1 shown in FIG. 1 is configured as a p-channel, wherein the drain terminal is connected to a terminal of the primary winding N1. Preferably, the source terminal of the switch M1 is connected to ground, i.e., the ground on the primary side.

On the input side, the flyback converter 3 has a C_bulk capacitor to which the input voltage Vin of the flyback converter is applied. The diode D1 provided on the secondary side is connected in series with the secondary winding N2. A capacitor Cout is provided in parallel to the series connection of the diode D1 and the secondary winding N2. The voltage on this capacitor Cout forms the output voltage Vout of the flyback converter 3 which, in turn, is provided on two output terminals K3, K4. The LED module 5 can be connected to these output terminals K3, K4. The LED module 5 comprises one or multiple LEDs, preferably an LED line, which has a plurality of LEDs connected in series.

The LED module 5 can also comprise a parallel circuit of a plurality of LED lines or a mixed circuit of parallel and series-connected LEDs.

Preferably, a measuring resistor R1 can be provided between the switch M1 and ground. At this measuring resistor R1, a signal can be picked up, wherein this signal VR1 reproduces the current I1 through the primary winding M1. By means of a comparator Kp, this measured signal is compared with a reference signal or a reference voltage Vref_hi0. The output of the comparator Kp is supplied to the control unit ST, wherein, alternatively to the embodiment shown in FIG. 1, the comparator Kp and the reference voltage Vref_hi0 can also be provided in the interior of the control unit ST.

Figure 2:
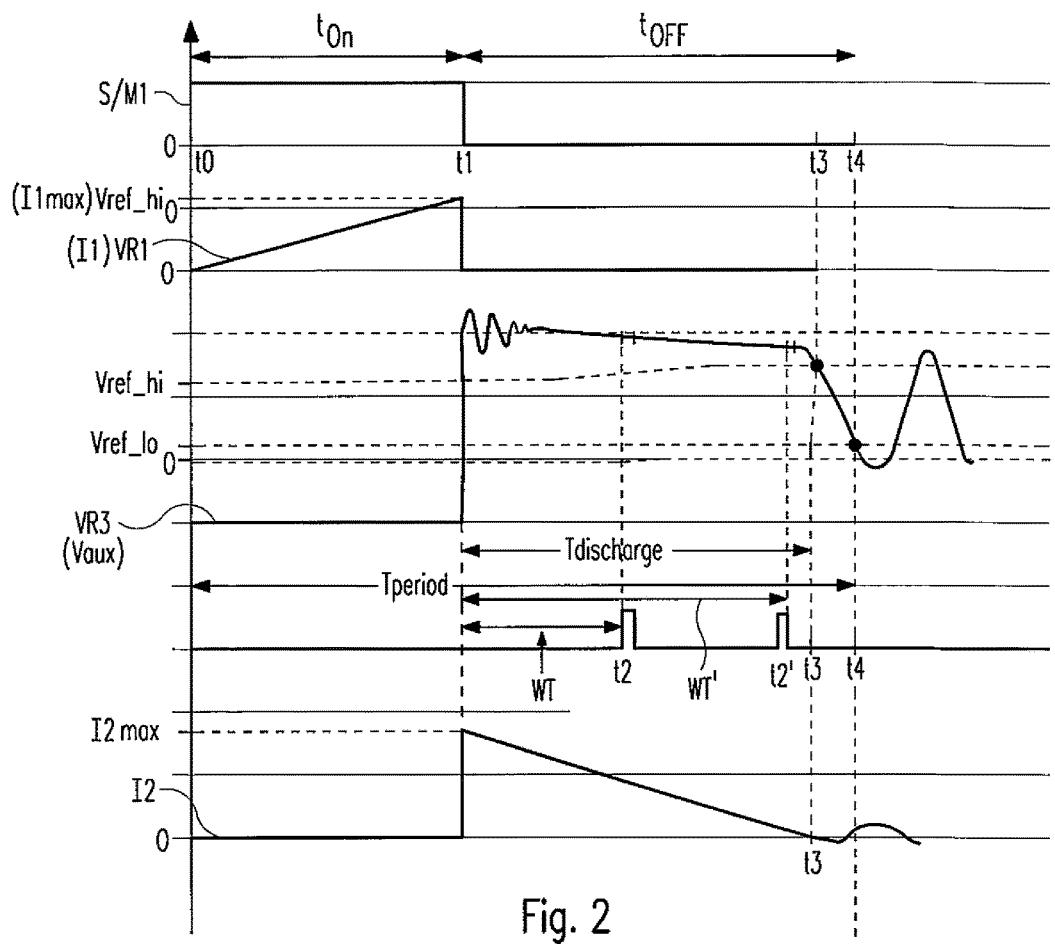
FIG. 2 is the plot of electrical parameters of the invention-based operating device.

Preferably, a maximum value I1max is provided for the current I1 on the primary side. The maximum value I1max can be externally supplied to the operating device 1 or can be defined by the operating device. Preferably, the reference voltage Vref_hi0 is adjusted in such a way that the measured signal VR1 corresponds to the reference voltage Vref_hi0 when the current I1 on the primary side reaches the maximum value I1max. As a result, the output of the comparator Kp supplies information to the operating device 1 of whether the current I1 on the primary side is below the maximum value I1max, or whether the current I1 on the primary side has reached the maximum value I1max. Consequently, the operating device 1 is able to open the switch M1 as soon as the current I1 on the primary side has reached or exceeded the maximum value I1max, or as soon as the measured signal VR1 has reached or exceeded the reference Vref_hi0. The typical temporal progression of the voltage VR1 representing the current I1 is shown in FIG. 2.

The controllable switch M1 is controlled by the control unit ST of the operating device, preferably without galvanic isolation between the switch M1 and the control unit ST. Here, the control unit ST controls the switch M1 alternately, wherein the duty cycle for the switching operation of the switch M1 can be calculated as follows:

$$TV = ton/(Tperiod),$$

wherein Tperiod depicts the total duration of a complete switching cycle for the switch M1 and ton corresponds to the activation period of the switch M1.

Besides the primary winding N1 and the secondary winding N2, the transformer T comprises also an auxiliary winding or detection winding Naux, which are preferably located on the primary side of the transformer T. To the auxiliary winding Naux a voltage is applied, which reproduces the output voltage Vout. In particular, it applies that Vaux=K1*Vout, wherein K1 is a constant, which depends on the winding ratios of the secondary winding and auxiliary winding.

Parallel to the detection winding Naux, an ohmic voltage divider consisting of two resistors R2, R3 is provided, on which a detection signal or detection voltage VR3 for detecting the voltage Vaux on the auxiliary winding Naux is picked up. This voltage VR3 is also representative for the output voltage Vout and it is proportional to the output voltage. The detection signal VR3 is supplied to the control unit ST. The detection winding Naux and the voltage divider R2, R3 form together the detection unit 4.

When the switch M1 on the primary side is turned on, the current I1 on the primary side constantly increases, which induces a constant negative voltage Vaux at the detection unit 4. When the current I1 has reached the predetermined maximum value I1max, the power switch M1 is turned off. Hereupon the detection voltage Vaux jumps to a positive value, oscillates for a certain time period and then settles at a voltage corresponding to the output voltage Vout.

Preferably, the detection voltage VR3 is supplied to a first comparator K1 and a second comparator K2.

By means of the first comparator K1, the detection signal VR3 is compared with a first reference voltage Vref_lo. Preferably, this reference voltage Vref_lo is a restart threshold for starting or restarting the controllable switch M1. When the detection signal VR3 has reached or fallen below this threshold value Vref_lo, the switch on the primary side is turned on again. Correspondingly, FIG. 2 shows that this threshold value Vref_lo is reached at the point of time t4. According to the invention, when detecting that the threshold value Vref_lo is reached, the control signal S/M1 for turning on the switch M1 is preferably increased, for example, from zero to a positive value. In particular, after each switching cycle, the switch is turned on at the point of time t4. However, in FIG. 2, the control signal S/M1 is not increased at the point of time t4 to show how the detection voltage VR3 acts after the secondary current has dropped to zero.

Thus, the switch M1 can be closed by the control unit ST as soon as the voltage has reached on the auxiliary winding Naux a corresponding lower threshold value. Since the detection voltage VR3 is representative for the voltage Vaux on the auxiliary winding and for the output voltage Vout, the switch M1 is closed again as soon as the output voltage Vout has reached a corresponding lower threshold value.

Preferably, the reference voltage Vref_lo is a fixed comparator threshold, which can be predetermined. For example, the reference voltage Vref_lo can be definitely predefined in the operating device 1, or it can be predetermined externally by means of a respective interface of the operating device 1. After pre-setting a specific value Vref_lo, this reference voltage remains preferably constant. At least, the reference Vref_lo remains constant for the time period of a plurality of switching cycles of the switch M1. In particular, the reference Vref_lo is independent of feedback values or measured values from the range of the operating device 1 or the LED module 5. Preferably, the reference voltage Vref_lo is less than half, in particular, less than 20%, 10% or 5% of the detection voltage VR3 in the steady state of opening the switch M1.

It is generally known that the flyback converter 3 can be operated according to a current continuous conduction mode, a current discontinuous conduction mode, or according to an operation in the threshold range between a current continuous conduction mode and a current discontinuous conduction mode. Preferably, an operating device 1 configured in accordance with the invention is operated in this threshold range, which is also called critical conduction mode or borderline mode. In the critical conduction mode, the switch M1 of the flyback converter 3 is turned on, as soon as it is detected that the current has dropped to zero through the secondary winding N2. Preferably, the switch M1 is turned on when the detection voltage VR3 has reached or fallen below the lower reference voltage Vref_lo.

The current I2 through the secondary winding N2 is a measure for the current through the LEDs or through the LED module 5. The mean value of the current I2 corresponds to the mean value of the current through the LEDs. To exactly control the current through the LEDs, it is important to detect as precisely as possible the Tdischarge duration between a switch-off of the switch M1 and a drop of the current I2 to zero. In fact, the mean value of the current through the secondary winding N2 can be defined as follows:

$$I2 = I2max * \frac{1}{2} * Tdischarge / Tperiod,$$

wherein I2max represents the maximum value of the current I2 directly after a switch-off of the switch and Tperiod represents the total duration of a complete switching cycle for the switch M1. In FIG. 2, the Tperiod extends between t0 and t4, Tdischarge between t1 and t3.

In particular, the second comparator K2 is now used for precisely detecting the discharge duration Tdischarge of the secondary winding N2 between the switch-off of the switch M1 and reaching the zero point through the secondary current I2, wherein the voltage Vaux at the auxiliary winding Naux of the detection voltage VR3 drops significantly at the zero crossing of the current I2. The second comparator K2 compares the detection voltage VR3 with a changeable reference voltage in the form of an adaptive threshold value Vref_hi.

The detection voltage is also supplied to a sample-and-hold circuit S+H, wherein the sample-and-hold circuit S+H can temporarily hold the analog values of the detection voltage. In particular, this sample-and-hold circuit S+H is used to scan the steady output voltage when the switch is turned off. The output of the sample-and-hold circuit S+H is supplied to an analog-to-digital converter ADC for converting analog acquired output voltage into digital values.

Preferably, the adaptive threshold value Vref_hi depends on the values of the output voltage Vout in steady state determined by the sample-and-hold circuit S+H and the analog-to-digital converter ADC. This dependency is shown in FIG. 1 by means of the arrow 8.

According to the invention, an adaptive threshold value Vref_hi is selected. For example, the adaptive threshold value Vref_hi can be selected as a certain percentage below the steady voltage, for example, 95%, 90% or 80% of the value of the steady voltage VR3.

As shown in FIG. 2, it is possible to determine by means of the reference voltage Vref_lo and the first comparator K1 the point of time t4 at which the operating device 1 turns the switch M1 on again.

In particular, this reference voltage Vref_lo is less than the adaptive threshold value Vref_hi. Furthermore, the reference voltage Vref_lo is preferably an unchangeable value. The restart of the switch M1 depending on the first comparator K1 has the advantage that, for example, the mains supply voltage Vmains is also low when the low reference voltage Vref_lo is reached, so that losses in the switch can be kept at a minimum.

Preferably, the process of falling below the adaptive and higher selected threshold value Vref_hi, is only used for determining precisely the discharge duration Tdischarge for the indirect determination of the current I2 on the secondary side. However, preferably, the actual restart of the switch on the primary side takes place only when in the further course of falling below the detection voltage VR3, the value drops below the definitely predefined threshold value Vref_lo.

FIG. 2 shows the course of different parameters of the operating device 1 over a period Tperiod of the flyback converter 3, i.e., during the time period of a complete switching cycle of the switch consisting of a switch-on duration ton of the switch M1 and a subsequent switch-off duration toff of the switch M1. In particular, the course of different parameters is depicted according to the embodiment of the operating device 1 shown in FIG. 1.

With reference to FIGS. 1 and 2, the control unit ST generates the control signal S/M1 for controlling the switch M1. During the duration ton, the switch M1 is closed by the control unit ST by means of the control signal S/M1.

Thereafter, the control signal S/M1 opens the switch M1 during a switch-off duration toff. The switch M1 is alternately turned on and off, so that during operation another switch-on duration ton occurs, following the switch-off duration toff shown in FIGS. 1 and 2. The switch-on duration ton and the following switch-off duration toff form together a period Tperiod of the operating device 1 of flyback converter 3. Thus, a sequence of a plurality of periods Tperiod takes place during operation.

The current I1 on the primary side through the primary winding N1 and through the switch M1 is reproduced by the measuring voltage VR1, wherein the measurement is picked up at the measuring resistor R1. During the switch-on duration ton, i.e., while the control signal S/M1 shows high levels, the current flows through the primary winding N1. This current I1 on the primary side increases linearly, starting from a zero value. Correspondingly, the measured signal VR1 also increases during the switch-on duration ton, as shown in FIG. 2.

At the point of time t1, when the measuring signal VR1 representing the current I1 on the primary side reaches the threshold value Vref_hi0, the control unit ST arranges for opening the switch M1. As a result, the diode D1 is operated in conducting direction and the energy stored in the transformer during the switch-on duration ton is transmitted to the secondary side of the transformer T. Thus, through the diode D1 the current I2 on the secondary side increases at the point of time t1 to a positive value and starts to decrease again linearly.

FIG. 2 also shows the course of the voltage Vaux and the auxiliary winding Naux or the measured voltage VR3, wherein these voltages are proportional to each other. During the switch-on duration ton, the detected voltage shows a constant negative value. At the point of time t1 of turning on the switch M1, the detection voltage jumps to a positive value, oscillates for a certain time period and then settles at a voltage corresponding to the output voltage Vout. At the same time, the steady detection voltage available after the oscillation process can remain constant or can have a constant negative decrease.

After the stationary state with a constant value or with a constant decrease, the steady detection voltage shows a significant drop. Preferably, this significant drop occurs when the current I2 drops through the secondary winding N2 to zero. After the significant drop, the detection voltage Vaux oscillates by preferably alternately dropping to zero and increasing again.

Preferably, the threshold value Vref_hi for detecting the discharge duration Tdischarge depends on the value of the steady detection voltage VR3. For this purpose, a waiting period WT can be stored in the control unit ST. This waiting period WT is shown in FIG. 2 and defines the time period, which has to be maintained after turning off the switch M1 before the detection voltage VR3 is detected or scanned for the purpose of determining the threshold value Vref_hi. FIG. 2 shows that the detection voltage VR3 takes place at the following point of time t2:

$$T2 = t1 + WT,$$

wherein t1 defines the point of time of turning off the switch M1

As described above, the waiting period WT, which has to be maintained after the switch is turned off to ensure that the output voltage or detection voltage VR3 is steady, can be definitely predetermined.

Alternatively, this waiting period WT can be definitely predetermined only at the start of the LED operation. As soon as at least one switch-on and switch-off cycle has been performed, this waiting period WT can be adaptively recalculated. For example, the waiting period of a specific cycle can amount to a specific percentage of the discharge duration Tdischarge of the previous cycle. FIG. 2 shows that, at the start of the LED operation, the output voltage or detection voltage VR3 is detected according to the predetermined waiting period WT. Thereafter, in a following cycle, a waiting period WT' is maintained, wherein this waiting period WT' amounts to x % of the discharge duration, for example, 90% or 80%.

A further embodiment of the invention provides that, again depending on the process of sampling or scanning the steady voltage Vaux while the switch is turned off, the discharge duration Tdischarge for indirectly determining the current I2 on the secondary side is determined in an adaptive manner, namely depending on said sampling, by detecting that the reference voltage Vref_lo has fallen below, and then a correction duration ΔT which depends on the sampling value is subtracted, as an adaptive correction factor, as it were.

Figure 3:
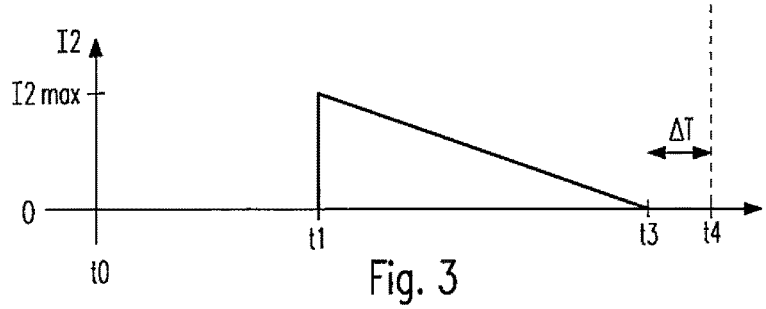
FIG. 3 is the plot of electrical parameters of the invention-based operating device according to an alternative embodiment.

This embodiment is shown in FIG. 3. Here, first of all the point of time t4 of falling below the reference value Vref_lo is taken into account in order to determine the discharge duration Tdischarge. Then, as a correction factor, a correction value ΔT is determined, which depends on the scanned reference voltage VR3. For example, these correction values ΔT can involve empirical values, which can be stored in a memory or look-up table inside the control unit ST. The correspondence between the scanned reference voltage VR3 and the resulting correction value ΔT is stored in this memory or look-up table.

According to the invention, the correction value ΔT is subtracted from the point of time t4 in order to determine the point of time t3 of the zero current:

$$t3 = t4 - \Delta T.$$

Therefore, the common denominator of these embodiments is that the discharge duration Tdischarge is preferably determined by taking into account the detection of the detection voltage or output voltage in a steady state.

According to a further embodiment, the comparator can be eliminated. For this purpose, the significant drop of the detection voltage VR3 at the point of time t3 following the stationary state can be directly detected with a quick analog-to-digital converter. In this embodiment, the comparator K2 shown in FIG. 1 is preferably not required and is substituted by an analog-to-digital converter (not shown). The control unit ST monitors the digital data generated by this analog-to-digital converter. As soon as the detection voltage VR3 is in a steady state, the control unit ST detects, based on these digital data, a potential significant drop of the detection voltage VR3. The detected point of time of the significant drop is then determined by the control unit ST as zero crossing of the current I2. As described above, the control unit ST can ultimately determine the current on the secondary side based on the time period between the switch-off of the switch and the significant drop of the detection voltage.

In the embodiment shown in FIG. 1, the output voltage Vout is determined indirectly, namely as the voltage which is set to a steady state condition at the auxiliary winding Naux when the switch is turned off.

According to the invention, it is also possible to provide a direct detection of the output voltage, especially by means of detecting a parameter on the secondary side, for example, by a detection of the output voltage Vout and subsequent transmission by means of galvanic isolation, for example, by means of an optocoupler. Therefore, the common denominator of the invention involves that the output voltage Vout is detected directly or indirectly, on the primary side or on the secondary side and entered as a parameter into the calculation of the discharge duration.

As mentioned above, this serves only the purpose of correctly calculating the discharge duration Tdischarge, in order to calculate indirectly the mean current on the output side. However, preferably, this detection does not have any effect on the actual restarting of the switch on the primary side.

According to the invention, it is important that no parameter directly or indirectly reproducing the current through the LEDs is fed back from the secondary side to the primary side. Only when the bridge of galvanic isolation for this measuring parameter is eliminated, the indirect determination of the LED current by taking into account the switch-off duration Toff makes sense.

What is claimed is:

1. An operating device (1) for operating LED lighting means, comprising:
    a potential-isolated clocked converter (3), having a transformer (T), which has a primary winding (N1) and a secondary winding (N2), and having a controllable switch (M1) arranged on the primary side, wherein the converter (3) is supplied with a supply voltage on the primary side and the lighting means is supplied on the secondary side by means of an output voltage (Vout) of the converter (3),
    means (4) for directly or indirectly detecting the output voltage (Vout), and
    a control unit (ST) for controlling the switch (M1),
    wherein while the switch (M1) is turned off, the secondary current (I2) through the secondary winding (N2) drops linearly, starting from a positive value,
    wherein the control unit (ST) is configured to detect adaptively a discharge duration (Tdischarge) between turning off the switch (M1) and a subsequent drop of the secondary current (I2) to zero, and
    wherein the discharge duration (Tdischarge) is determined by taking into account a value representing the detected output voltage (Vout) during a steady state that results from turning off the switch (M1), and detecting when the detected output voltage (Vout) drops below said value.

2. An operating device (1) according to claim 1 further comprising:
    an analog-to-digital converter for converting analog acquired output voltage (Vout) into digital values, and
    wherein the control unit (ST) is configured to detect the discharge duration (Tdischarge) between turning off the switch (M1) and the subsequent drop of the secondary current (I2) to zero, depending on the digital values.

3. An operating device (1) according to claim 1, wherein the discharge duration (Tdischarge) is determined depending on a comparison between the detected output voltage and an adaptive threshold value (Vref_hi) that is greater than zero.

4. An operating device (1) according to claim 3, wherein the adaptive threshold value (Vref_hi) depends on a value of the steady output voltage (Vout) after the switch (M1) has been turned off), and further wherein the switch (M1) is turned on depending on a comparison between the detected output voltage (Vout) after the switch (M1) is turned off and a fixed threshold value (Vref_lo).

5. An operating device (1) according to claim 4, wherein the control unit (ST) comprises a first comparator (K1) for comparing the detected output voltage (Vout) to the fixed threshold value (Vref_lo) after the switch (M1) is turned off in order to determine when to turn on the switch (M1) and a second comparator (K2) for comparing the detected output voltage (Vout) and the adaptive threshold value (Vref_hi) to determine the discharge duration (Tdischarge) between turning off the switch (M1) and the subsequent drop of the secondary current (I2) to zero.

6. An operating device (1) for operating LED lighting means, comprising:
    a potential-isolated clocked converter (3), having a transformer (T), which has a primary winding (N1) and a secondary winding (N2), and having a controllable switch (M1) arranged on the primary side, wherein the converter (3) is supplied with a supply voltage on the primary side and the lighting means is supplied on the secondary side by means of an output voltage (Vout) of the converter (3),
    means (4) for directly or indirectly detecting the output voltage (Vout), and
    a control unit (ST) for controlling the switch (M1),
    wherein while the switch (M1) is turned off, the secondary current (I2) through the secondary winding (N2) drops linearly, starting from a positive value,
    wherein the control unit (ST) is configured to detect adaptively a discharge duration (Tdischarge) between turning off the switch (M1) and a subsequent drop of the secondary current (I2) to zero; and
    further wherein, to detect the discharge duration (Tdischarge), first the point of time (t4) of falling below a fixed threshold value (Vref_lo) can be determined by means of the detected output voltage (Vout), and then this point of time (t4) can be corrected by means of an adaptive time period ($\Delta T$).

7. An operating device (1) according to claim 6, wherein the adaptive time period ($\Delta T$) depends on a detected value of the steady output voltage (Vout) available after the switch (M1) has been turned off.

8. An operating device (1) for operating LED lighting means, comprising:
    a potential-isolated clocked converter (3), having a transformer (T), which has a primary winding (N1) and a secondary winding (N2), and having a controllable switch (M1) arranged on the primary side, wherein the converter (3) is supplied with a supply voltage on the primary side and the lighting means is supplied on the secondary side by means of an output voltage (Vout) of the converter (3),
    means (4) for directly or indirectly detecting the output voltage (Vout), and
    a control unit (ST) for controlling the switch (M1),
    wherein while the switch (M1) is turned off, the secondary current (I2) through the secondary winding (N2) drops linearly, starting from a positive value,
    wherein the control unit (ST) is configured to detect adaptively a discharge duration (Tdischarge) between turning off the switch (M1) and a subsequent drop of the secondary current (I2) to zero and the discharge duration (Tdischarge) is determined depending on a comparison between the detected output voltage and an adaptive threshold value (Vref_hi), and
    further wherein the adaptive threshold value (Vref_hi) depends on a value of the steady output voltage (Vout) after the switch (M1) has been turned off and the control unit (ST) is configured to select the threshold value (Vref_hi) as a specific percentage below the value of the steady output voltage (Vout) available after the switch (M1) has been turned off.

9. A control unit (ST) for controlling an operating device (1) for LED lighting means, wherein the operating device (1) comprises a potential-isolated clocked converter (3), having a transformer (T) for a galvanic isolation between a primary side and a secondary side,
wherein the control unit (ST) comprises:
an output for transmitting a control signal (S/M1) to control a switch (M1) arranged in the converter (3) on the primary side, wherein, while the switch (M1) is turned off, the secondary current (I2) on the secondary side of the transformer (T) drops linearly, starting from a positive value (I2max),
an input for directly or indirectly detecting the output voltage (Vout) of the converter (3), and
wherein the control unit (ST) is configured to detect adaptively a discharge duration (Tdischarge) between a switch-off of the switch (M1) and a subsequent drop in the secondary current (I2) to zero, and wherein the discharge duration (Tdischarge) is determined by taking into account a value representing the detected output voltage (Vout) during a steady state that results from turning off the switch (M1), and detecting when the detected output voltage (Vout) drops below said value.

10. A control unit (ST) according to claim 9 wherein the discharge duration (Tdischarge) is determined depending on a comparison between the detected output voltage (Vout) and an adaptive threshold value (Vref_hi) and the adaptive threshold value (Vref_hi) is greater than zero and depends on a value of the steady output voltage (Vout) after the switch (M1) has been turned off.

11. A control unit (ST) according to claim 10 wherein the switch (M1) is turned on depending on a comparison between the detected output voltage (Vout) after the switch (M1) is turned off and a fixed threshold value (Vref_lo).

12. A control unit (ST) according to claim 11, wherein the control unit (ST) comprises a first comparator (K1) for comparing the detected output voltage (Vout) to the fixed threshold value (Vref_lo) after the switch (M1) is turned off in order to determine when to turn on the switch (M1) and a second comparator (K2) for comparing the detected output voltage (Vout) and the adaptive threshold value (Vref_hi) to determine the discharge duration (Tdischarge) between turning off the switch (M1) and the subsequent drop of the secondary current (I2) to zero.

* * * * *